United States Patent

[11] 3,627,610

| [72] | Inventors | Bruce M. Guelich<br>Pittsburgh, Pa.;<br>Charles Porter, Andrews, Ind. |
|------|-----------|---------------------|
| [21] | Appl. No. | 802,442 |
| [22] | Filed     | Feb. 26, 1969 |
| [45] | Patented  | Dec. 14, 1971 |
| [73] | Assignee  | H. K. Porter Company, Inc.<br>Pittsburgh, Pa. |

[54] CONTINUOUS CURING OF ELONGATED ELASTOMERIC ARTICLES
4 Claims, 7 Drawing Figs.

[52] U.S. Cl.................................................. 156/278,
156/188, 156/244, 156/278, 156/287
[51] Int. Cl............................................. B32b 31/12
[50] Field of Search........................................... 156/164,
278, 287, 188, 244, 306, 497, 148, 149, 285;
264/DIG. 51

[56] References Cited
UNITED STATES PATENTS

| 2,888,954 | 6/1959 | Gates | 156/244 X |
| 2,974,713 | 3/1961 | Hydrick | 156/244 |
| 3,242,528 | 3/1966 | Elder | 18/6 |
| 3,310,447 | 3/1967 | Matthews | 156/244 |
| 3,336,176 | 8/1967 | Metney | 156/244 X |

FOREIGN PATENTS

| 906,139 | 10/1960 | Great Britain | 264/DIG. 51 |
| 1,012,562 | 12/1965 | Great Britain | 264/DIG. 51 |

*Primary Examiner*—Carl D. Quarforth
*Assistant Examiner*—S. R. Hellman
*Attorney*—W. Wyclif Walton

ABSTRACT: This invention contemplates curing an elongated elastomeric article of indefinite length such as reinforced hose, elastomer insulated wire or the like by passing the article longitudinally under pressure through a heated complementary tube with a film of lubricant separating the article from the tube wall and at the exit end of the tube the article is additionally compressed to compact and bond together its components in a "wiper die" on passing therethrough for removal of the lubricant from its surface.

PATENTED DEC 14 1971

3,627,610

INVENTORS.
BRUCE M. GUELICH
CHARLES PORTER
BY [signature]
ATTORNEY.

CONTINUOUS CURING OF ELONGATED ELASTOMERIC ARTICLES

CROSS REFERENCE TO RELATED APPLICATION

The assignee of this application is assignee also of a copending application, Ser. No. 686,037 filed Nov. 28, 1967 by Frederick M. Galloway, Samuel W. Riley and Robert H. Sinnamon wherein continuous manufacture of reinforced elastomeric hose is disclosed and claimed, including employment of a "fluidized" bed for continuously vulcanizing the hose; the present invention contemplates continuous vulcanizing in apparatus of different and improved character as compared with that employing said "fluidized" bed.

BACKGROUND OF THE INVENTION

1. Field of the Invention

It has long been the custom in the industry to produce the uncured elastomeric hose in finite lengths separately coiled on trays and in various ways subjected to the vulcanizing heat and pressure required for curing the elastomeric components. It has been difficult to secure uniform curing by these methods, substantially all of which require excessive manual operations for transferring the hose from place to place during manufacture and the delays incident to curing by the "batch" procedure have unduly limited the amount of finished hose that can be produced using extruding apparatus of normal capacity, forcing interruptions and hence loss of efficiency in the operation of the latter.

2. Description of the Prior Art

Efforts to avoid the restrictions imposed by "batch" operation of hose vulcanizers have resulted in the development of so called "continuous" vulcanizers of which one example is disclosed in U.S. Pat. No. 2,974,713 granted to Julius Hydrick Jr. Mar. 14, 1961 in which hose is formed on a flexible mandrel and passed through an elongated tubular vulcanizer at the ends of which glands respectively receiving and discharging the hose are designed to contain superheated stream admitted to the tube for supplying the necessary vulcanizing heat. These glands have been found difficult to maintain, however, and the method disclosed and claimed in said patent has not been outstandingly successful in practice.

Another type of continuous vulcanizer for elastomeric hose and the like is disclosed and claimed in said copending application of Galloway, et al., wherein the hose is passed and repassed through an elongated chamber in which jets of highly heated air agitate and substantially suspend minute particles of refractory material in a so called "fluidized" bed whereby heat for curing the elastomer is imparted to it from contact with the heated air and particles.

SUMMARY OF THE INVENTION

In accordance with the present invention uncured reinforced elastomeric hose or the like produced continuously or in individual pieces of finite length in accordance with the method of said prior patent or said copending application or otherwise is subjected to heat treatment and pressure whereby its elastomeric components are cured as the hose is passed longitudinally through a heated tube in which the hose is confined by the tube wall but prevented from adhering thereto by a film of lubricant applied to the hose as it enters the tube, the lubricant being wiped from the hose as the latter passes from the tube by a "wiper die" of complementary contour with the hose but having an orifice slightly smaller than the hose cross section which insures radial compression of the components of the cured but still relatively hot hose as it leaves the die. This eliminates voids and insures internal bonding of said components within the hose wall and the hose thereafter may be passed through a cooling tube or otherwise brought to room temperature prior to reeling for shipment or storage.

BRIEF DESCRIPTION OF THE DRAWING

In the accompanying drawing to which more specific reference will hereinafter be made.

DESCRIPTION OF THE PREFERRED EMBODIMENT

Figure 1:
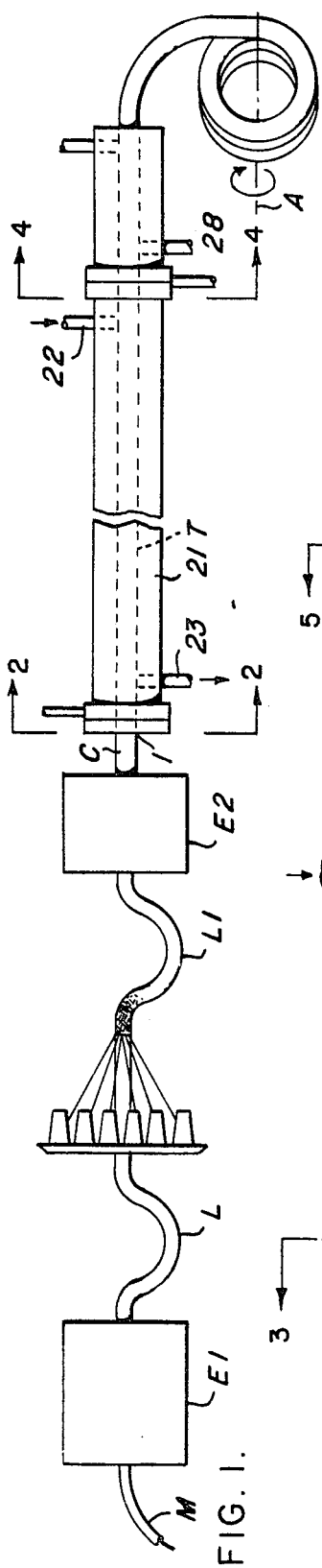
FIG. 1 is a diagrammatic side elevation of typical hose producing apparatus associated with our novel continuous during apparatus.

Referring now more particularly to the drawing the hose forming apparatus therein illustrated may comprise several units similar to those employed in said prior U.S. Pat. No. 3,974,713, including a primary extruder E1, reinforcement applying apparatus exemplified by a braider B and a second or covering extruder E2. If a flexible mandrel M is employed, as is the practice according to said patent, it is fed continuously during the hose forming operation into the first extruder for application to its surface of an inner elastomeric layer 1, then passed through the reinforcement applying apparatus B which applies a plurality of strands of reinforcement R, preferably braiding them about the inner layer in mutually opposite directions, although a lapper, knitter or any other relatively continuous reinforcement applying apparatus may here be employed if preferred.

Following application of the reinforcement an outer covering layer C of elastomeric material is applied by extruder E2 into which the reinforced inner layer and mandrel is next fed, this extruder in accordance with accepted practices preferably including vacuum means (not shown) for minimizing entrainment of air between the inner and outer elastomeric layers and promoting the bonding of said layers through interstices in the reinforcement.

As it issues from the second extruder the uncured hose passes through means defining a special port 1 hereinafter more fully described where a film of a relatively liquid lubricating material (not shown) is applied in a substantially uniform coating to its outer surface. This lubricant, preferably a heat-resistant water-soluble oleaginous fluid such as the oil supplied by Union Carbide Corporation of New York, N.Y. under the trade designation 50-HB-5100 forms a thin film which permits the hose to slide through the complementary bore of a vulcanizing tube T into which the hose passes from the second extruder whereby the inner surface of the tube, but for the film of lubricant, contacts and confines the hose in heat exchanging relation thereto as the hose moves axially through it. At the discharge end of the latter a wiper die 10, hereinafter more fully described, physically scrapes or wipes the film of lubricant from the hose, discharging it through a bleeder port 12 for reuse while the hose, now fully cured, is passed axially through a cooling tube K in which it is rapidly cooled to approximately ambient temperature before using cut into suitable commercial lengths and reeled for shipment to consumers.

Depending on factors well known in the art means for progressively impelling the hose as it is formed and passed into and through the several units of the apparatus may be employed and we have represented one such unit in FIG. 1 merely by a coil of the hose as it may be wrapped about the body of a rotating drum, capstan or the like, the axis of rotation of which is indicated at A in FIG. 1.

As numerous types of impelling units are readily available and their principles of operation well known it is unnecessary herein to supply further description or illustration thereof.

In the somewhat general description thus far of the practices of our invention we have deferred detailed reference to certain components of the apparatus and operating conditions we deem substantially essential in realizing its objectives. These will now be more fully described and while we have thus far treated the invention as one for continuous manufacture of hose or the like it will be understood our elastomer curing method and apparatus may be utilized for sporadic and relatively intermittent curing of finite lengths of hose or other elongated articles having elastomeric components and produced in any desired manner and with the aid of production units other than those shown and described.

Figure 2:
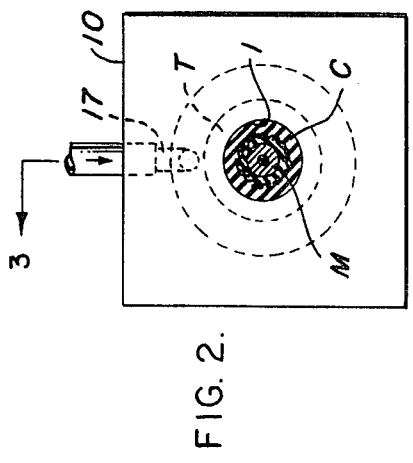
FIG. 2 is a diagrammatic enlarged vertical section on line 2—2 in FIG. 1.
Figure 3:
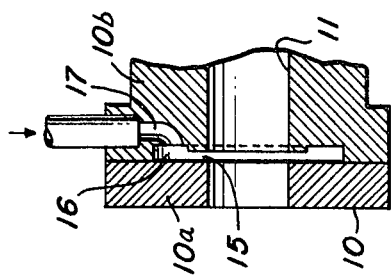
FIG. 3 is a diagrammatic vertical section on line 3—3 in FIG. 2.
Figure 4:
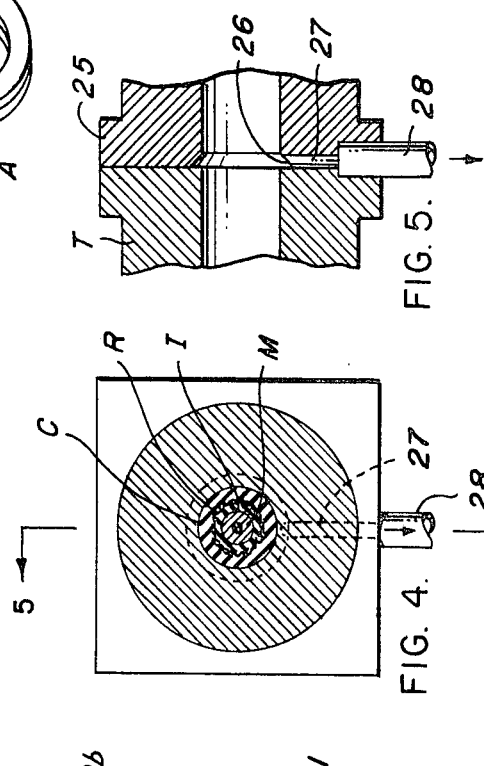
FIG. 4 is a diagrammatic enlarged vertical section on line 4—4 in FIG. 1.
Figure 5:
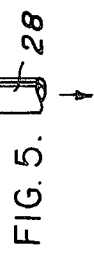
FIG. 5 is a diagrammatic vertical section on line 5—5 in FIG. 4.

Thus in FIGS. 2 and 3, we have shown in greater detail the preferred construction of the lubricant applying means between the second extruder E2 and the vulcanizing tube T comprising a substantially cylindrical die 10 in two axially aligned parts, 10a, 10b having an axial bore 11 through which the reinforced inner layer of those passes after application of the elastomeric covering layer C to its surface.

The parts 10a and 10b when assembled as best illustrated in FIG. 3 define a narrow radial passage 15 and as the now covered hose passes through it lubricant is applied to its surface, under circumferentially uniform pressure from a surrounding annular feeding passage 16.

A duct 17 through which lubricant is supplied to annular feeding passage 16 has connected with it means (not shown) for maintaining a supply of lubricant under sufficient pressure to insure application of the film of lubricant and as the hose then moves axially into complementary heating tube T adjacent to the lubricating unit is prevented from adhering to the confining walls of the tube by the film of lubricant between them but without inhibition of heat exchange from the tube to the hose for curing the elastomeric components of the latter.

Heat is supplied to tube T by circulation of a suitable fluid such as a heat-resistant oil through the interior of a jacket formed by an outer tube 21 having pipes 22, 23 for admission and discharge respectively of the heating fluid supplied by any suitable means (not shown) for introduction to the jacket through pipe 22. Preferably the heating medium is passed through the jacket in a generally axial direction opposed to that assumed by the hose in passing through the inner tube T so the medium is discharged from that end of the unit first entered by the hose which thus is subjected to increasing temperature during its passage through the unit.

At the discharge end of the heating tube T there is positioned as mentioned, a "wiper die" 25 presenting a circular port 26 complementary to the hose cross section but preferably of slightly less diameter than the hose whereby as the hose passes through it the lubricant film is wiped from its surface for discharge into an annular passage 27 surrounding the port and thence into a discharge duct 28 for discard or reuse as preferred.

The pressure to which the hose is subjected while passing through port 26 in the wiper die 25 compacts its elastomeric components, and forces the inner and outer layers thereof into and through interstices in the reinforcing layer R and into bonded relation to each other as well as to the strands of the reinforcing material.

This compression of the hose is of particular importance in the manufacture of so called "hydraulic" hose designed to resist extremely high internal pressures and hence usually reinforced by braid of multiple steel wires or the like covering up to 90 percent of the surface area of the inner elastomeric layer which offer relatively small interstices of minimum aggregate area through which the elastomeric layers can be extruded for bonding to each other; in such cases the pressure of the wiper die is probably more effective in insuring good bonding between the elastomeric layers and the reinforcing layer than of the former to each other.

Figure 7:
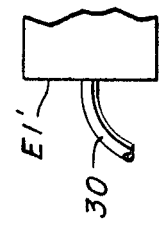
FIG. 6 is a fragmentary side elevation of a piece of hose manufactured in accordance with the invention containing a flexible mandrel which may be employed in the operation and FIG. 7 is a fragmentary diagrammatic side elevation of a portion of a modified embodiment of the apparatus.
Figure 6:
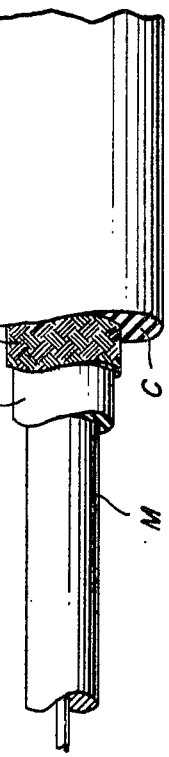

A modified embodiment of the invention of which only so much as is required for comprehension is diagrammatically illustrated in FIG. 7: it will be understood as comprising as well units not there illustrated but which may be substantially identical with those employed in the preferred embodiment with their relative positions as indicated in the preceding figures.

In this modification, in place of a flexible mandrel M on which the hose is formed, and lengths of which therefore have to be successively spliced end to end in order to maintain continuous passage of hose through the apparatus we here employ as internal support for the hose inner layer a gaseous fluid under pressure, preferably air, which is supplied through a pipe 30 from a suitable source (not shown) to extruder E1', the air being introduced to the inner layer of hose through the port in the extruder corresponding to that through which the flexible mandrel M passes in extruder E1 when a flexible mandrel is being employed.

The operations subsequent to extrusion of the inner layer are substantial duplications of those heretofore described and their description therefore need not here be repeated it being obvious the step of extracting mandrel pieces from the hose after it is severed to commercial lengths is eliminated when air is used for internal support, and it is usually advisable to apply a clamp or the like or otherwise maintain the internal pressure in the hose substantially constant; it is often practical, however, to leave the hose end unobstructed momentarily while a length is being cut off provided it be quickly reclamped or obstructed so internal pressure can soon be rebuilt within it.

After the hose has issued from the vulcanizing tube, and from the cooling tube if one is employed or has otherwise been brought substantially to room temperature and cut into lengths suitable for commercial purposes, the individual lengths, with or without end fittings as specified by the purchaser or as directed by the manufacturer, are wound in coils or on reels in accordance with usual practices. Preferably however, they are coiled or reeled with both ends of each accessible and as a last operation it may then be desirable, although usually not necessary, to introduce live steam into one end of the hose length and to maintain the flow of steam through the hose for several minutes. This has the effect of physically dislodging and carting off with the condensate any foreign matter, including mandrel lubricant, which may remain in the hose, leaving it substantially sterile and chemically clean internally, while affording assurance of completion of the curing of the elastomeric components should additional curing be required or appropriate.

It will be appreciated we have herein used the term "hose" in a generic sense to refer to any elongated article including wires, rods or the like carrying coverings or uncured elastomeric content which must be subjected to heat and at least confined, or preferably subjected to external compacting pressure during curing of the elastomer. Hence the principles of the invention are applicable to the manufacture of such articles as well as tubular ones an essential feature being that they be capable of receiving a uniform coating of lubricant enabling them to be passed into and through a heating tube in substantial heat exchange relation to the tube surface without adhesion thereto during passage, and of course lubricants other than the specific oil to which we have referred may likewise be employed, and lubricants solid at room temperature, provided they are sufficiently fluid and heat resistant at the ambient temperature may be utilized if preferred.

It is further to be noted that it has been found difficult exactly to equalize the rates of operation of the several units of the apparatus as to the linear speed of the article passing through each, although not too difficult to secure average rates over a period of time. Hence it is usually advantageous to permit loops to form between adjacent units, for example the loops L, L1 whereby fluctuations in the relative rate of operation of adjacent units may be compensated for, or proper adjustment made by attendants if indicated to be needed, as by undue lengthening or shortening of one or more of the loops.

We claim:

1. In the method of making an elongated flexible laminated article of indefinite length that contains an elastomeric component the improvement which comprises progressively vulcanizing the elastomeric content of the article by the steps of passing the article axially through a complementary port while progressively applying to its surface a circumferentially and longitudinally continuous film of lubricant, then passing the article through a heated tube in heat exchanging relation through said film with the inner wall of said tube and finally mechanically removing the film from the outer surface of the article while applying radial inward pressure to said surface.

2. The method defined in claim 1 the said article being tubular in which the interior of the article is occupied by a body resistant to radial inward pressure whereby the wall of the article is compressed during application of said pressure to said article outer surface.

3. The method defined in claim 2 in which said body comprises an elongated flexible mandrel disposed in the interior of the article.

4. The method defined in claim 2 which said body comprises a mass of gaseous fluid under pressure.